(12) United States Patent
Betz et al.

(10) Patent No.: US 6,250,682 B1
(45) Date of Patent: Jun. 26, 2001

(54) BELT TENSIONER FOR A VEHICLE OCCUPANT RESTRAINT SYSTEM

(75) Inventors: Hans-Peter Betz, Böbingen; Raimund Rupp, Alfdorf, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/080,007

(22) Filed: May 15, 1998

(30) Foreign Application Priority Data

May 20, 1997 (DE) .......................................... 297 08 880 U

(51) Int. Cl.[7] .................................................. B60R 22/46
(52) U.S. Cl. ............................................. 280/806; 297/480
(58) Field of Search .................................. 280/806, 807, 280/801.1; 297/480, 474, 468

(56) References Cited

U.S. PATENT DOCUMENTS

| | | |
|---|---|---|
| 4,508,287 | 4/1985 | Nilsson . |
| 4,767,161 | 8/1988 | Sedlmayr et al. . |
| 5,350,194 | 9/1994 | Fohl . |
| 5,667,246 * | 9/1997 | Miller, III ............................ 280/806 |
| 5,927,756 * | 7/1999 | Wier ..................................... 280/806 |

FOREIGN PATENT DOCUMENTS

| | | |
|---|---|---|
| 3407379 | 6/1986 | (DE) . |
| 296 09 054 U | 10/1996 | (DE) . |
| 0093237 | 2/1983 | (EP) . |
| 0186880 | 12/1985 | (EP) . |
| 0558963 | 2/1993 | (EP) . |

* cited by examiner

*Primary Examiner*—Daniel G. DePumpo
*Assistant Examiner*—F. Zeender
(74) *Attorney, Agent, or Firm*—Tarolli, Sundheim, Covell, Tummino & Szabo L.L.P.

(57) ABSTRACT

A belt tensioner, in particular a buckle tensioner, for a vehicle occupant restraint system having a belt, comprises a housing, a gas generator for generating compressed gas in the case of restraint, a working space into which the compressed gas flows, a piston part displaceable by the compressed gas and a belt engaging device. The belt engaging device is in force-transferring relationship with the fastened belt. The tensioner further comprises a traction transfer device extending through the working space, which traction transfer device connects the belt engaging device with the piston part, and a sheathing for the traction transfer device which at least partially covers the traction transfer device within the working space. The sheathing is of a material having a temperature stability with respect to the hot compressed gas.

5 Claims, 3 Drawing Sheets

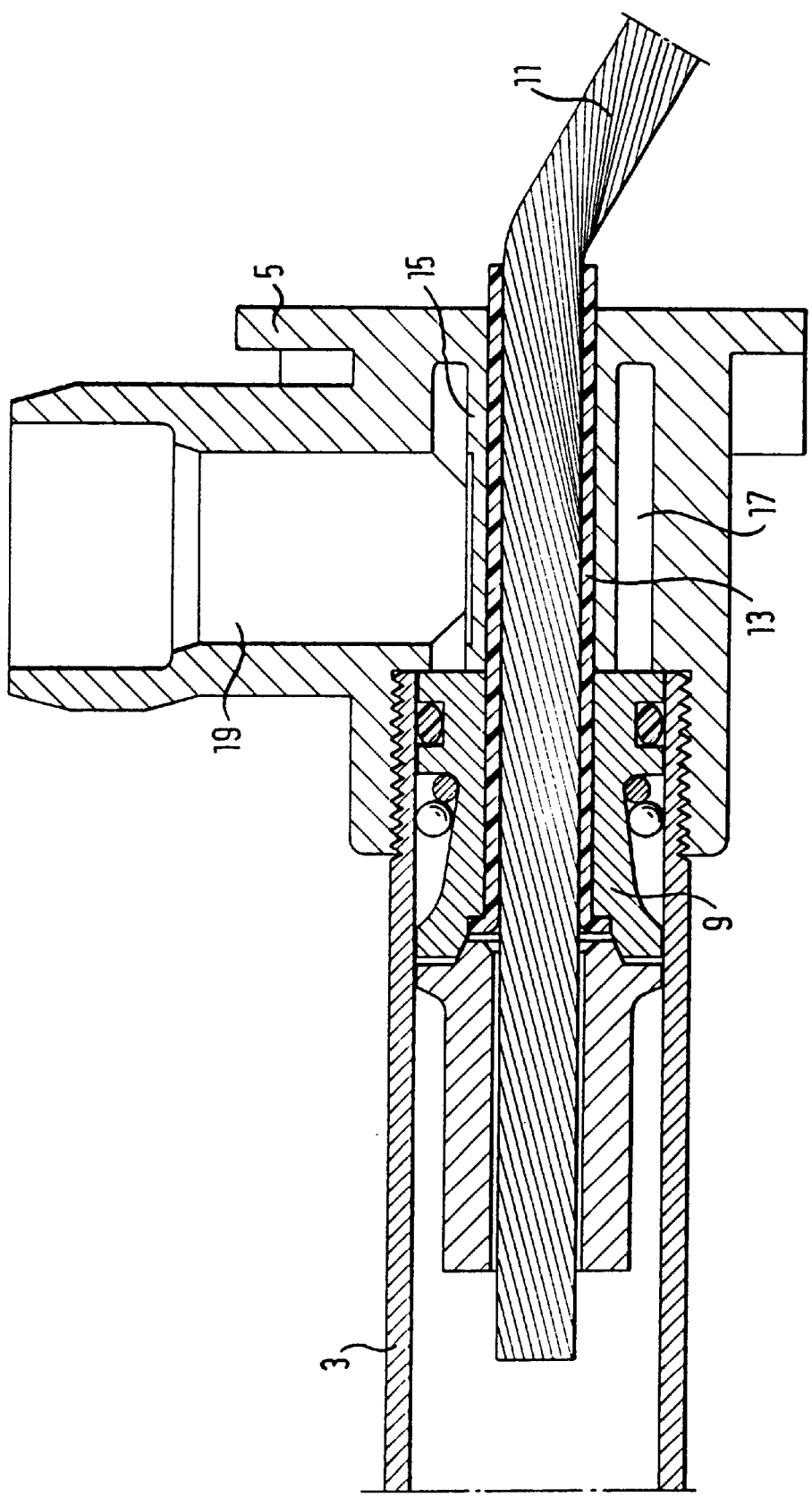

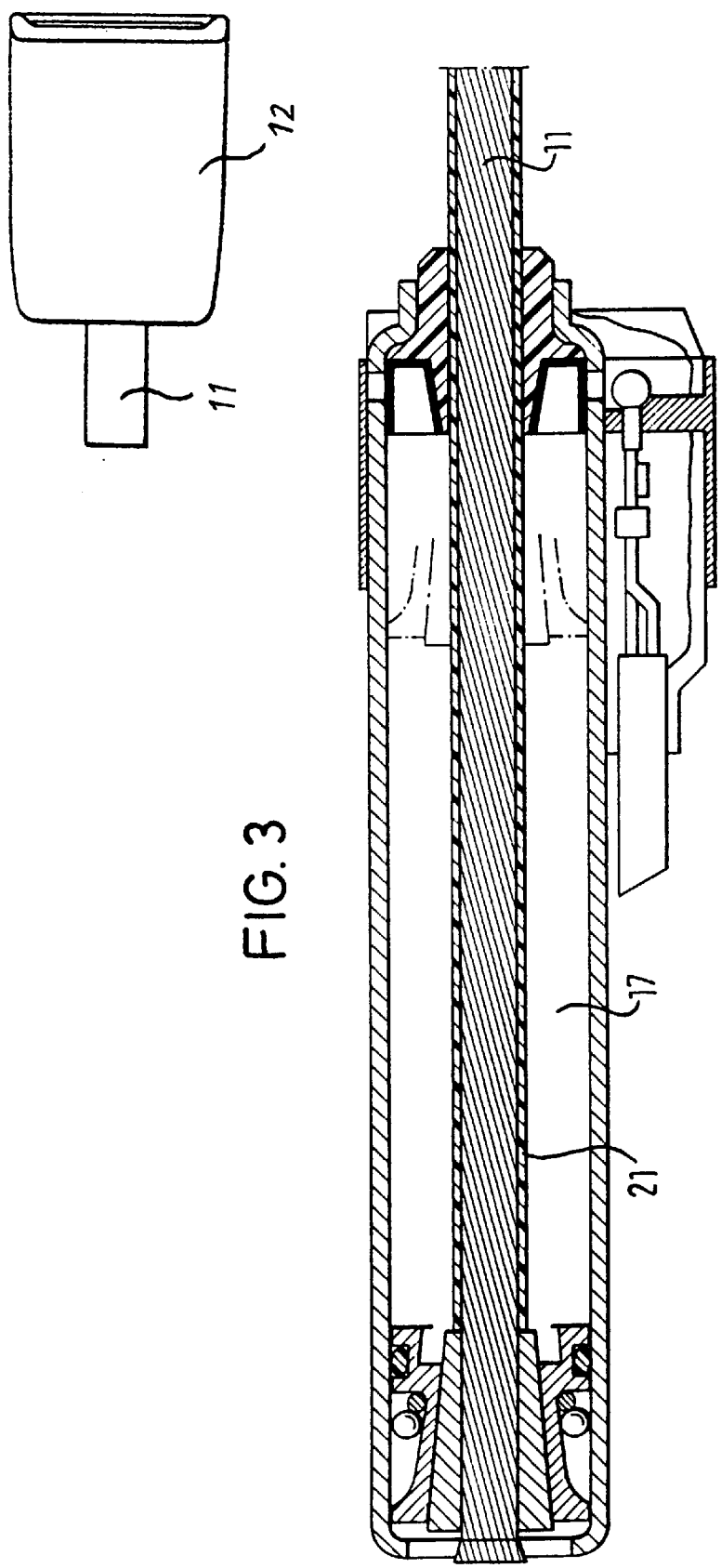

Figure 1:
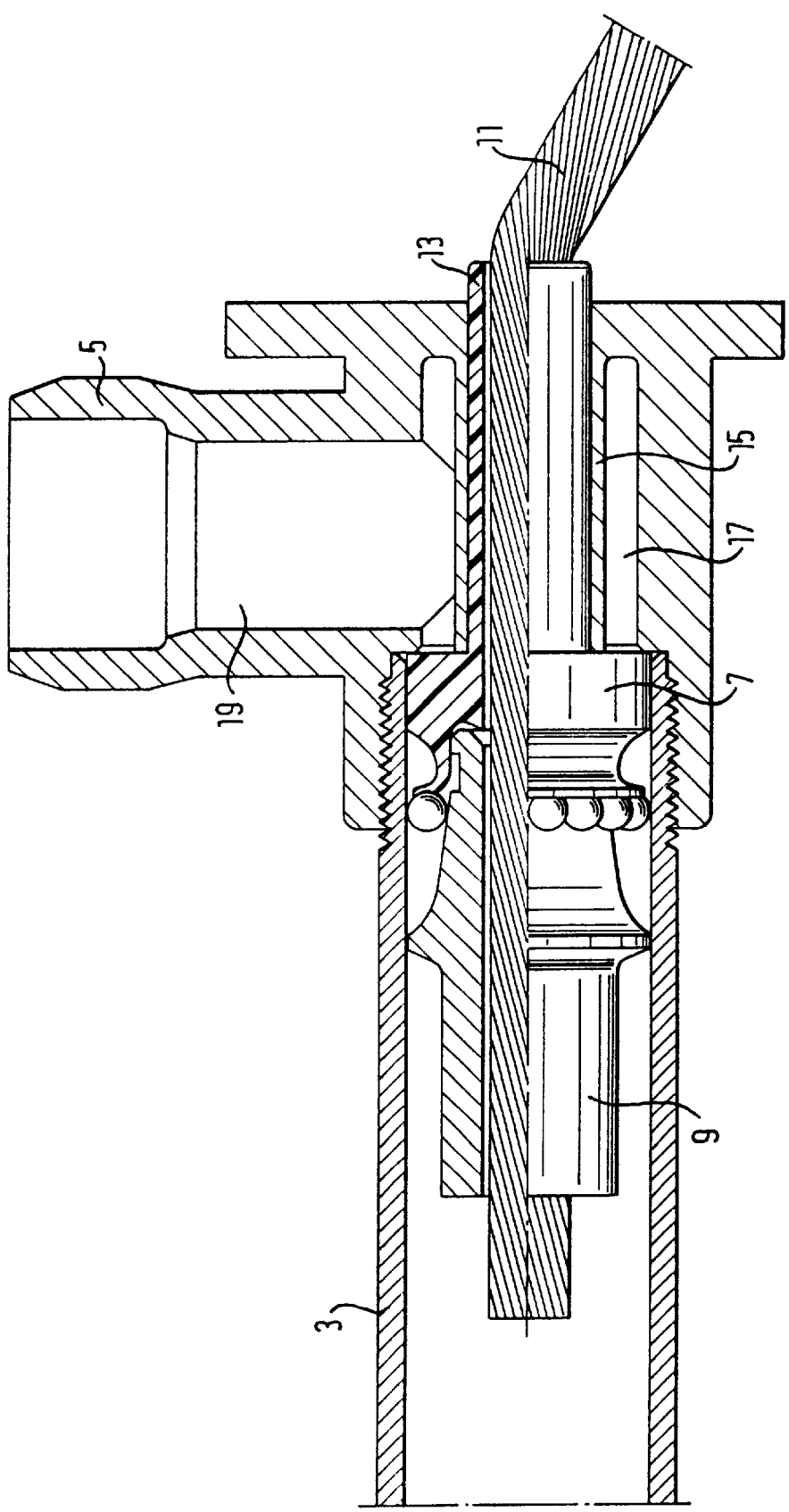

BELT TENSIONER FOR A VEHICLE OCCUPANT RESTRAINT SYSTEM

TECHNICAL FIELD

The invention relates to a belt tensioner, in particular a buckle tensioner for a vehicle occupant restraint system.

BACKGROUND OF THE INVENTION

In the case of restraint, hot compressed gas, released from the gas generator, flows into the working space in order to displace the piston part. The traction transfer means, normally a traction cable, is at the same time exposed to high temperatures through direct contact with the hot compressed gas and can thereby be damaged. In buckle tensioners, in addition to the temperature load there is also a high traction load of the traction transfer means, which is exerted by the vehicle occupant moving forward. The traction transfer means is hitherto overdimensioned in order to be able to withstand the loads, which, however, has a negative influence on the manufacturing costs of the belt tensioner and also its weight.

BRIEF SUMMARY OF THE INVENTION

The invention provides a belt tensioner in which the traction transfer means is subjected to smaller thermal loads than in known belt tensioners. The belt tensioner according to the invention comprises a housing, a gas generator for generating compressed gas in the case of restraint, a working space into which the compressed gas flows, a piston part displaceable by the compressed gas and a belt engaging means. The belt engaging means is in force-transferring relationship with the fastened belt. The tensioner further comprises a traction transfer means extending through the working space, which traction transfer means connects the belt engaging means with the piston part, and a sheathing for the traction transfer means which at least partially covers the traction transfer means within the working space. The sheathing is of a material having a temperature stability with respect to the hot compressed gas.

Although it is known to cover the traction transfer means in the form of a cable by a plastic tube for sealing and visual purposes, this tube, however, does usually not extend into the working space and is not of a material featuring high temperature stability.

Preferably, the traction transfer means is a traction cable. By using a traction cable, there exists the problem that this can only be sealed with difficulty to the opening provided in the end wall of the housing, through which it extends. This is due to the outer surface of the traction cable not being of cylindrical shape. With the use of a sheathing, the outer contour can be adapted exactly to the contour of the opening, so that the sheathing has a dual function, serving also for the better sealing of the working space. The hitherto provided expensive seals can thereby be largely eliminated, whereby the belt tensioner becomes cheaper.

The sheathing can be a shrinkable tube formed of a material having temperature stability, a layer extruded onto the traction cable, or a sleeve. The sleeve can be pressed onto the traction transfer means or can also be connected with the piston part.

For better sealing and for better guidance of the traction transfer means, in a preferred embodiment a guide is provided projecting into the working space, at which guide the outer surface of the casing, constructed as a sliding surface, abuts.

DETAILED DESCRIPTION OF THE DRAWINGS

FIG. 1 shows a longitudinal sectional view through the upper part of a belt tensioner according to the invention, in accordance with a first embodiment, FIG. 2 shows a longitudinal sectional view through the upper part of the belt tensioner according to the invention, in accordance with a second embodiment, and FIG. 3 shows a longitudinal sectional view through the belt tensioner according to the invention in accordance with a third embodiment.

DETAILED DESCRIPTION OF PREFERRED EMBODIMENTS

In FIG. 1 a belt tensioner, more precisely a buckle tensioner for a vehicle occupant restraint system, is shown. The belt tensioner has a housing made up of several parts, of which in FIG. 1 a tube 3 and a housing part 5, screwed onto the end of the tube, are shown. In the interior of the tube 3, a displaceably arranged piston part 7 is provided, which is coupled via a cable connector 9 with a traction transfer means 11 in the form of a traction cable. The piston part 7 is manufactured from a plastic material having high temperature stability, onto which a sheathing of the traction transfer means 11 in the form of a sleeve 13 is molded. The sleeve 13 extends through a likewise sleeve-shaped guide 15 which is molded on the housing part 5 and projects into a working space 17 for inflowing compressed gas. The working space 17 has several sections, namely a section situated in the interior of the tube 3, which is passed through by the piston part 7 on activation of the belt tensioner, and a section in the form of a circular ring in the housing part 5. In the starting position illustrated in FIG. 1, the piston part 7 directly adjoins the section of the working space 17 provided in the housing part 5.

A chamber 19 extending radially to the working space 17 serves to accommodate the cartridge-like gas generator housing which is not illustrated in FIG. 1. The chamber 19 opens into the working space 17.

In the case of restraint, the generated compressed gas flows into the working space 17 and is prevented from direct contact with the traction transfer means 11 by the guide 15. The compressed gas moves the piston part 7 to the left, so that the sleeve 13 is partially drawn out of the guide 15. The sleeve 13 serves here for shielding the traction transfer means 11, which is not exposed to the hot compressed gases.

In the embodiment illustrated in FIG. 2, the sleeve 13 is not connected integrally with the piston part 9, but rather is constructed as a separate part which is bent towards the exterior at its end on the tube side and thereby is entrained on displacement of the piston part 9. The sleeve 13 can be pressed onto the traction transfer means 11, which, however, is not imperatively necessary, and is made of plastics or metal. A buckle 12 defines the traction transfer means.

In the embodiment illustrated in FIG. 3, the sheathing of the traction transfer means 11 is a shrinkable tube 21 or a coating having temperature stability, which is extruded onto the traction transfer means 11 embodied as a traction cable. With a coating applied by extrusion, a large selection of materials is available which have temperature stability.

The belt tensioner according to the invention has inter alia the following advantages as compared with those known hitherto:

Owing to the better sealing effect, the tensioner efficiency can be improved, and the tensioner efficiency can be kept within tight, predeterminable limits.

The mounting is simplified and made less expensive, because no separate seals are provided.

The breaking load of the traction transfer means is improved, because the traction cable is no longer exposed to high temperatures.

What is claimed is:

1. A belt tensioner for a vehicle occupant restraint system having a belt, with
   a housing,
   a gas generator for generating hot compressed gas in the case of restraint,
   a working space into which said compressed gas flows,
   a piston part displaceable by said compressed gas,
   a belt engaging means which is in force-transferring relationship with said belt,
   a traction transfer means extending through said working space, which traction transfer means connecting said belt engaging means with said piston part, and
   a sheathing for said traction transfer means which at least partially covers said traction transfer means within said working space,
   a guide projecting into said working space being provided for said traction transfer means,
   said sheathing being a sleeve of a material having a temperature stability with respect to said hot compressed gas, and
   said sheathing having an outer surface constructed as a sliding surface contacting said guide on its inner side.

2. The belt tensioner according to claim 1, wherein said traction transfer means is a traction cable.

3. The belt tensioner according to claim 1, wherein said sleeve is pressed onto said traction transfer means.

4. The belt tensioner according to claim 1, wherein said sleeve is connected with said piston part.

5. The belt tensioner according to claim 1, wherein said sleeve is made of plastic.

* * * * *